US011511742B2

(12) United States Patent
Ueda

(10) Patent No.: US 11,511,742 B2
(45) Date of Patent: Nov. 29, 2022

(54) VEHICLE CONTROL DEVICE

(71) Applicant: SUBARU CORPORATION, Tokyo (JP)

(72) Inventor: Arata Ueda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 32 days.

(21) Appl. No.: 17/239,913

(22) Filed: Apr. 26, 2021

(65) Prior Publication Data

US 2021/0339745 A1 Nov. 4, 2021

(30) Foreign Application Priority Data

May 1, 2020 (JP) .............................. JP2020-081387

(51) Int. Cl.
*B60W 30/14* (2006.01)
(52) U.S. Cl.
CPC ............... *B60W 30/143* (2013.01); *B60W 2510/0638* (2013.01); *B60W 2510/1005* (2013.01); *B60W 2520/105* (2013.01)
(58) Field of Classification Search
CPC ....... B60W 30/143; B60W 2510/0638; B60W 2510/1005; B60W 2520/105
See application file for complete search history.

(56) References Cited

U.S. PATENT DOCUMENTS

| 2016/0082964 A1* | 3/2016 | Chunodkar | B60W 40/13 701/70 |
| 2017/0174220 A1* | 6/2017 | Puri | B60W 50/0097 |
| 2019/0263400 A1* | 8/2019 | Chunodkar | B60W 10/04 |
| 2021/0171012 A1* | 6/2021 | Ravichandran | B60W 10/06 |

FOREIGN PATENT DOCUMENTS

JP 62-195417 A 8/1987

* cited by examiner

*Primary Examiner* — George C Jin
(74) *Attorney, Agent, or Firm* — Troutman Pepper Hamilton Sanders LLP

(57) ABSTRACT

A vehicle control device includes an acceleration rate feedback processor, a target driving force processor, a requested torque processor, a supercharging determination torque processor, a requested speed processor, and a supercharging operation determination processor. The requested torque processor calculates requested torque of an engine on the basis of target torque obtained from a target driving force and a transmission ratio of a transmission. When determining the requested torque is in the vicinity of supercharging determination torque, the acceleration rate feedback processor inhibits calculation of an amount of acceleration rate feedback. When determining that the requested torque is in the vicinity of the supercharging determination torque, the requested speed processor corrects a target speed in accordance with an altitude, to set a requested speed at a smaller value than on flat ground as the altitude becomes higher.

5 Claims, 8 Drawing Sheets

| TARGET TORQUE / SUPERCHARGING DETERMINATION TORQUE | ATMOSPHERIC PRESSURE (mmHg) | | |
|---|---|---|---|
| | 400 | ... | 760 |
| 0.60 | 53 | ... | 100 |
| 0.70 | 53 | ... | 100 |
| 0.80 | 53 | ... | 100 |
| 0.85 | 53 | ... | 100 |
| 0.90 | 53 | ... | 100 |
| 0.95 | 70 | ... | 100 |
| 0.97 | 80 | ... | 100 |
| 0.99 | 90 | ... | 100 |
| 1.00 | 100 | ... | 100 |
| 1.01 | 100 | ... | 100 |
| 1.03 | 100 | ... | 100 |
| 1.05 | 100 | ... | 100 |
| 1.10 | 100 | ... | 100 |
| 1.15 | 100 | ... | 100 |
| 1.20 | 100 | ... | 100 |
| 1.30 | 100 | ... | 100 |
| 1.40 | 100 | ... | 100 |

FIG. 5

| REQUESTED TORQUE / SUPERCHARGING DETERMINATION TORQUE | ATMOSPHERIC PRESSURE (mmHg) | | |
|---|---|---|---|
| | 400 | ... | 760 |
| 0.60 | 100 | ... | 100 |
| 0.70 | 100 | ... | 100 |
| 0.80 | 100 | ... | 100 |
| 0.85 | 100 | ... | 100 |
| 0.90 | 100 | ... | 100 |
| 0.95 | 100 | ... | 100 |
| 0.97 | 100 | ... | 100 |
| 0.99 | 110 | ... | 100 |
| 1.00 | 120 | ... | 100 |
| 1.01 | 120 | ... | 100 |
| 1.03 | 120 | ... | 100 |
| 1.05 | 120 | ... | 100 |
| 1.10 | 110 | ... | 100 |
| 1.15 | 100 | ... | 100 |
| 1.20 | 100 | ... | 100 |
| 1.30 | 100 | ... | 100 |
| 1.40 | 100 | ... | 100 |

FIG. 7

VEHICLE CONTROL DEVICE

CROSS-REFERENCE TO RELATED APPLICATIONS

This application claims priority from Japanese Patent Application No. 2020-081387 filed on May 1, 2020, the entire contents of which are hereby incorporated by reference.

BACKGROUND

The disclosure relates to a vehicle control device for a vehicle including, as an engine, an engine with a supercharger.

In recent years, various proposals for driver assistance techniques for vehicles such as automobiles have been made and put into practice. Such techniques are aimed at reducing burdens on drivers and enhancing pleasure and safety in driving.

Driver assistance as mentioned above includes an adaptive cruise control (ACC) and a lane keeping control, allowing for automatic travel of a vehicle along a traveling lane while keeping a clearance for a preceding vehicle. Furthermore, a locator processor allows for the automatic travel of the vehicle to a destination.

SUMMARY

An aspect of the technology provides a vehicle control device configured to perform a vehicle speed control of a vehicle in which a driving force from an engine including a supercharger is transmitted to a driving wheel through a transmission. The vehicle control device includes an acceleration rate feedback processor, a target driving force processor, a requested torque processor, a supercharging determination torque processor, a requested speed processor, and a supercharging operation determination processor. The acceleration rate feedback processor is configured to perform calculation of an amount of acceleration rate feedback on the basis of a target acceleration rate and a current actual acceleration rate. The target acceleration rate is calculated in the vehicle speed control. The target driving force processor is configured to calculate a target driving force on the basis of the target acceleration rate and the amount of the acceleration rate feedback. The requested torque processor is configured to calculate requested torque of the engine on the basis of target torque. The target torque is calculated on the basis of the target driving force and a transmission ratio of the transmission. The supercharging determination torque processor is configured to calculate supercharging determination torque on the basis of a rotational speed of the engine and atmospheric pressure. The supercharging determination torque is provided to determine whether or not to switch on the supercharger. The requested speed processor is configured to calculate a requested speed on input side of the transmission, on the basis of a target speed. The target speed is calculated on the basis of the target driving force and an actual vehicle speed of the vehicle. The supercharging operation determination processor is configured to determine whether to switch on or off the supercharger, on the basis of a result of comparison of the requested torque and the supercharging determination torque. On the condition that the requested torque is in the vicinity of the supercharging determination torque, the acceleration rate feedback processor is configured to inhibit the calculation of the amount of the acceleration rate feedback. On the condition that the requested torque is in the vicinity of the supercharging determination torque, the requested speed processor is configured to correct the target speed in accordance with an altitude, to set the requested speed at a smaller value than on flat ground as the altitude becomes higher.

An aspect of the technology provides a vehicle control device configured to perform a vehicle speed control of a vehicle in which a driving force from an engine including a supercharger is transmitted to a driving wheel through a transmission. The vehicle control device includes an acceleration rate feedback processor, a target driving force processor, a requested torque processor, a supercharging determination torque processor, and a supercharging operation determination processor. The acceleration rate feedback processor is configured to perform calculation of an amount of acceleration rate feedback on the basis of a target acceleration rate and a current actual acceleration rate. The target acceleration rate is calculated in the vehicle speed control. The target driving force processor is configured to calculate a target driving force on the basis of the target acceleration rate and the amount of the acceleration rate feedback. The requested torque processor is configured to calculate requested torque of the engine on the basis of target torque. The target torque is calculated on the basis of the target driving force and a transmission ratio of the transmission. The supercharging determination torque processor is configured to calculate supercharging determination torque on the basis of a rotational speed of the engine and atmospheric pressure. The supercharging determination torque is provided to determine whether or not to switch on the supercharger. The supercharging operation determination processor is configured to determine whether to switch on or off the supercharger, on the basis of a result of comparison of the requested torque and the supercharging determination torque. When determining that the requested torque is in the vicinity of the supercharging determination torque, the acceleration rate feedback processor is configured to inhibit the calculation of the amount of the acceleration rate feedback. When determining that the target torque is smaller than the supercharging determination torque, the requested torque processor is configured to add, to the target torque, an amount by which output torque decreases in accordance with an altitude.

An aspect of the technology provides a vehicle control device configured to perform a vehicle speed control of a vehicle in which a driving force from an engine including a supercharger is transmitted to a driving wheel through a transmission. The vehicle control device includes circuitry. The circuitry is configured to perform calculation of an amount of acceleration rate feedback on the basis of a target acceleration rate and a current actual acceleration rate. The target acceleration rate is calculated in the vehicle speed control. The circuitry is configured to calculate a target driving force on the basis of the target acceleration rate and the amount of the acceleration rate feedback. The circuitry is configured to calculate requested torque of the engine on the basis of target torque. The target torque is calculated on the basis of the target driving force and a transmission ratio of the transmission. The circuitry is configured to calculate supercharging determination torque on the basis of a rotational speed of the engine and atmospheric pressure. The supercharging determination torque is provided to determine whether or not to switch on the supercharger. The circuitry is configured to calculate a requested speed on input side of the transmission, on the basis of a target speed. The target speed is calculated on the basis of the target driving force and an actual vehicle speed of the vehicle. The circuitry is configured to determine whether to switch on or off the supercharger, on the basis of a result of comparison of the requested torque and the supercharging determination torque. When determining that the requested torque is in the vicinity of the supercharging determination torque, the circuitry is configured to inhibit the calculation of the amount of the acceleration rate feedback. When determining that the requested torque is in the vicinity of the supercharging determination torque, the circuitry is configured to correct the target speed in accordance with an altitude, to set the requested speed at a smaller value than on flat ground as the altitude becomes higher.

An aspect of the technology provides a vehicle control device configured to perform a vehicle speed control of a vehicle in which a driving force from an engine including a supercharger is transmitted to a driving wheel through a transmission. The vehicle control device includes circuitry. The circuitry is configured to perform calculation of an amount of acceleration rate feedback on the basis of a target acceleration rate and a current actual acceleration rate. The target acceleration rate is calculated in the vehicle speed control. The circuitry is configured to calculate a target driving force on the basis of the target acceleration rate and the amount of the acceleration rate feedback. The circuitry is configured to calculate requested torque of the engine on the basis of target torque. The target torque is calculated on the basis of the target driving force and a transmission ratio of the transmission. The circuitry is configured to calculate supercharging determination torque on the basis of a rotational speed of the engine and atmospheric pressure. The supercharging determination torque is provided to determine whether or not to switch on the supercharger. The circuitry is configured to determine whether to switch on or off the supercharger, on the basis of a result of comparison of the requested torque and the supercharging determination torque. When determining that the requested torque is in the vicinity of the supercharging determination torque, the circuitry is configured to inhibit the calculation of the amount of the acceleration rate feedback. When determining that the target torque is smaller than the supercharging determination torque, the circuitry is configured to add, to the target torque, an amount by which output torque decreases in accordance with an altitude.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 summarizes an example of a map of a target torque correction rate versus atmospheric pressure.

FIG. 7 summarizes an example of a map of a target speed correction rate versus the atmospheric pressure.

DETAILED DESCRIPTION

Figure 1:
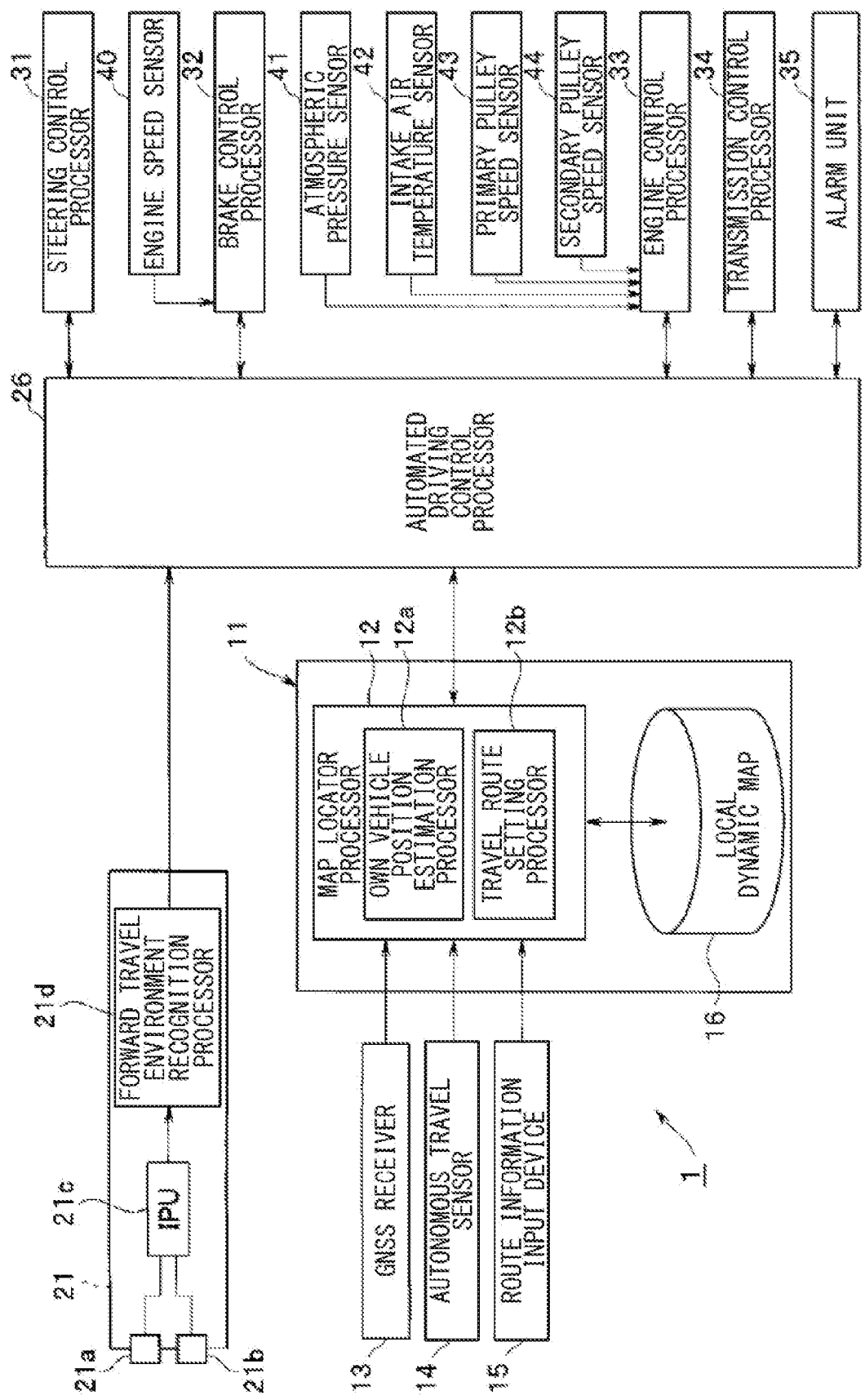
FIG. 1 is a schematic configuration diagram of an automated driving system.

In an ACC control, for example, a preceding vehicle is recognized by a forward recognition apparatus. The forward recognition apparatus includes an on-vehicle camera, various radar sensors, or any combination thereof. The on-vehicle camera and the various radar sensors are mounted on vehicles. In the ACC control, in a case where any preceding vehicle is captured, a target vehicle speed is set, to carry out a follow-up travel control to the preceding vehicle. The setting of the target vehicle speed is provided on the basis of, for example, a vehicle speed of the preceding vehicle and a clearance for the preceding vehicle. Moreover, in the ACC control, in a case where the preceding vehicle makes a stop, a control is carried out, to allow an own vehicle to make a following stop with a predetermined clearance and to make a following start after a start of the preceding vehicle. In contrast, in the ACC control, in a case with no preceding vehicle captured, a constant speed travel control is carried out, with a set vehicle speed serving as the target vehicle speed. The set vehicle speed is set by, for example, a driver.

In an engine control accompanying such an ACC control, for example, a target acceleration rate is calculated on the basis of the target vehicle speed and an own vehicle speed, to calculate requested torque. The requested torque is provided for generation of the target acceleration rate. Thus, a control of an electronic controlled throttle valve is performed in accordance with the requested torque calculated. Generally, a change in the requested torque in this case is suppressed as small as possible, as compared to torque requested by the driver through an accelerator operation. Accordingly, on the occasion of the ACC control, making a control of an engine including a supercharger may cause control hunching, i.e., alternate repetition of a supercharging state and a non-supercharging state in a short period of time. Thus, for example, Japanese Unexamined Patent Application Publication (JP-A) No. S62-195417 discloses a supercharging pressure control apparatus of an internal combustion engine. The supercharging pressure control apparatus controls whether to operate a supercharger or to stop operation of the supercharger, on the basis of a ratio Q/N of an amount of intake air and the number of revolutions. The supercharging pressure control apparatus has a setting value, or a threshold, provided to determine whether to stop the operation of the supercharger. In a case with a constant speed travel device switched ON, i.e., in a case with the ACC control switched ON, the threshold is set at a greater value than in a case with the constant speed travel device switched OFF.

As in the technique described in JP-A No. S62-195417, the threshold is varied with whether the ACC control is switched ON or whether the ACC control is switched OFF. Even in this case, however, the possibility of the control hunting still remains when the own vehicle is travelling in the highlands.

While the supercharger is in a non-supercharging state, a low oxygen concentration in the highland air inhibits output torque as instructed by the requested torque from being generated as on flat ground. The output torque as instructed by the requested torque means the output torque in accordance with an amount of intake air. In contrast, even in the highlands, switching ON the supercharger makes it possible to generate, as on the flat ground, the output torque as instructed by the requested torque. Thus, on highland travel, the output torque changes stepwise, i.e., changes rapidly, on the occasion that the supercharger is switched between the non-supercharging state and a supercharging state.

Thus, on the highland travel, switching the supercharger from the non-supercharging state to the supercharging state causes a rapid increase in the output torque and excessive acceleration. This immediately brings the supercharger back to the non-supercharging state. Thereupon, shortage of the output torque occurs again, causing the supercharger to switch from the non-supercharging state to the charging state. Thus, the engine control accompanying the ACC control involves the control hunting because of the repetitive switching between the non-supercharging state and the supercharging state on the highland travel. This tends to impair the pleasure of travel.

It is desirable to provide a vehicle control device that makes it possible to make a vehicle speed control without causing control hunting for a supercharger even at a high altitude with a low air density.

In the following, some embodiments of the disclosure are described in detail with reference to the accompanying drawings. Note that the following description is directed to illustrative examples of the disclosure and not to be construed as limiting the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 2:
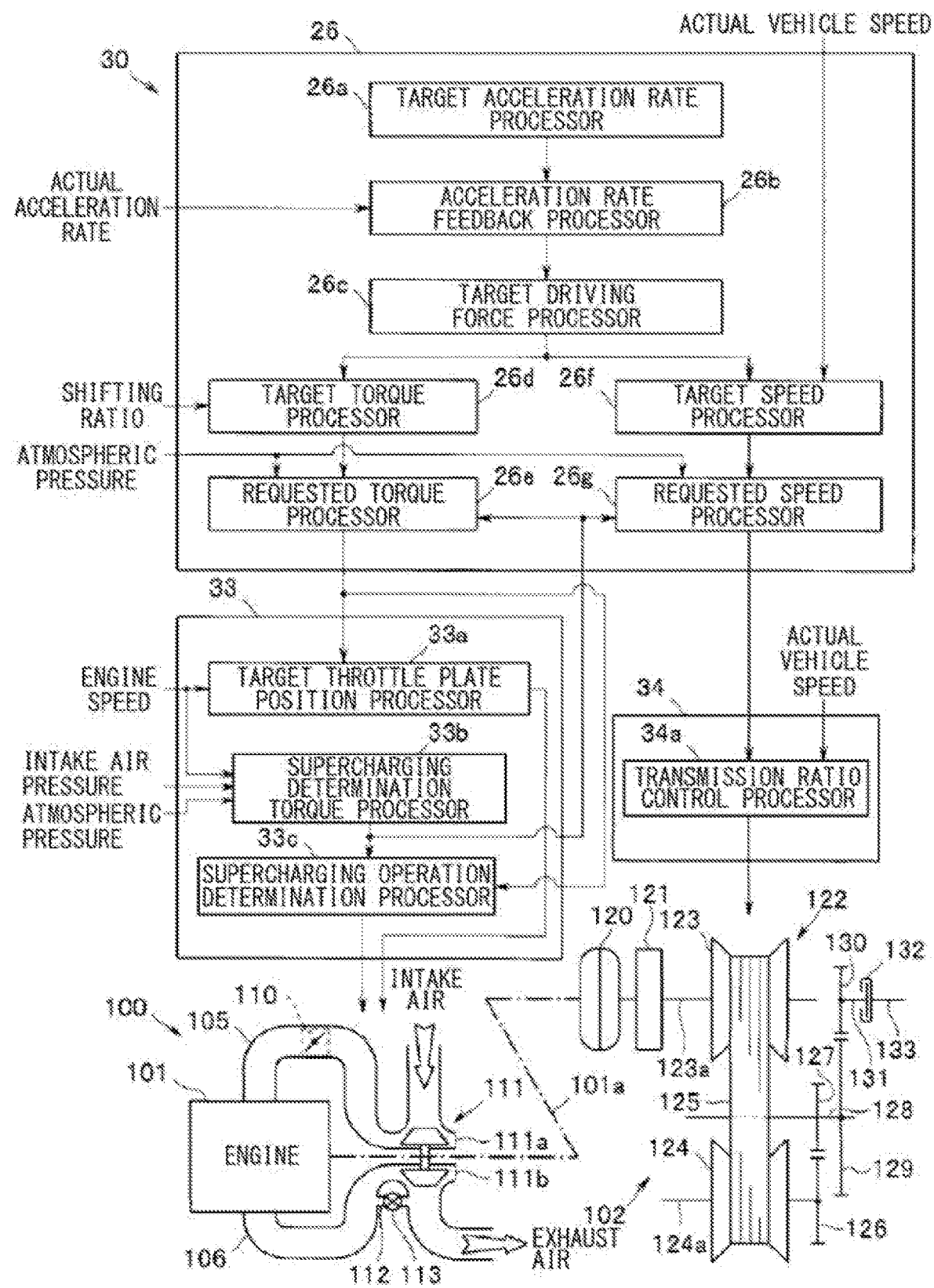
FIG. 2 is a schematic configuration diagram of a vehicle control device provided in the automated driving system.

The drawings are related to the embodiments of the disclosure. FIG. 1 is a schematic configuration diagram of an automated driving system. FIG. 2 is a schematic configuration diagram of a vehicle control device provided in the automated driving system.

Prior to description of a configuration of an automated driving system 1 according to an embodiment of the disclosure, a drive system 100 of a vehicle, or an own vehicle, is described in outline, with reference to FIG. 2. The vehicle, or the own vehicle, is controlled by a vehicle control device of the automated driving system 1.

The drive system 100 of the vehicle in this embodiment may include an engine including a turbocharger (hereinafter simply referred to as the "engine") 101 and a continuously variable transmission (CVT) 102. In one embodiment of the disclosure, the engine 101 may serve as an engine including a supercharger, and the CVT 102 may serve as a transmission configured to change continuously a transmission ratio.

The engine 101 may communicate with an intake pipe 105 on intake side and communicate with an exhaust pipe 106 on exhaust side. A throttle valve 110 of an electronic controlled throttle may be provided halfway on the intake pipe 105. A compressor 111a of a turbocharger 111 may be provided on more upstream side of the intake pipe 105 than the throttle valve 110.

A turbine 111b of the turbocharger 111 may be provided halfway on the exhaust pipe 106. The exhaust pipe 106 may include a bypass passage 112 that bypasses the turbine 111b. A wastegate valve 113 may be provided on the bypass passage 112. Controlling an opening of the wastegate valve 113 makes it possible to make a supercharging control of the turbocharger 111. It is to be noted that the turbocharger 111 is hereinafter also called a supercharger 111.

The CVT 102 may include a torque converter 120 and a transmission 122. The torque converter 120 may be coupled to an output shaft 101a of the engine 101. The transmission 122 may be coupled to the torque converter 120 through a forward-reverse switching device 121.

The transmission 122 may include a pulley input shaft 123a and a pulley output shaft 124a. The pulley input shaft 123a may be coupled to the forward-reverse switching device 121. The pulley output shaft 124a may be parallel to the pulley input shaft 123a. On the pulley input shaft 123a, a primary pulley 123 may be provided. On the pulley output shaft 124a, a secondary pulley 124 may be provided. Around the pulleys 123 and 124, a transmission belt 125 may be wound. The transmission belt 125 may be of a winding type such as a steel belt or a chain belt. Relatively changing a winding radius of the transmission belt 125 around the pulleys 123 and 124 makes it possible for the transmission 122 to set the transmission ratio continuously.

On the pulley output shaft 124a, a first output gear 126 may be provided. The first output gear 126 may mesh with a first input gear 127. The first input gear 127 may be provided on a front wheel output shaft 128.

On the front wheel output shaft 128, a second output gear 129 may be provided. The second output gear 129 may mesh with a second input gear 130. The second input gear 130 may be provided on a transfer shaft 131. The transfer shaft 131 may be coupled to a rear wheel output shaft 133 through a transfer clutch 132.

As illustrated in FIG. 1, the automated driving system 1 may include a locator unit 11, a camera unit 21, and an automated driving control processor 26. In one embodiment of the disclosure, the camera unit 21 may serve as a travel environment acquisition unit.

The locator unit 11 may include a map locator processor 12 and a high-precision road map database 16. In one embodiment of the disclosure, the high-precision road map database 16 may serve as a storage.

To input side of the map locator processor 12, a GNSS (Global Navigation Satellite System, or a global positioning satellite system) receiver 13, an autonomous travel sensor 14, and a route information input device 15 may be coupled. In one embodiment of the disclosure, the GNSS receiver 13 may serve as an own vehicle position acquisition unit, and the autonomous travel sensor 14 may serve as a driving state acquisition unit. The GNSS receiver 13 may receive positioning signals transmitted from a plurality of positioning satellites. The autonomous travel sensor 14 allows for autonomous travel in an environment, e.g., inside a tunnel, where low reception sensitivity from GNSS satellites inhibits effective reception of the positioning signals. The autonomous travel sensor 14 may include, for example, a vehicle speed sensor, a yaw rate sensor, and a longitudinal acceleration rate sensor. That is, the map locator processor 12 may perform localization from a travel distance and an azimuth, on the basis of, for example, a vehicle speed detected by the vehicle speed sensor, a yaw rate detected by the yaw rate sensor, and a longitudinal acceleration rate detected by the longitudinal acceleration rate sensor.

The route information input device 15 may be a terminal device to be operated by an occupant, mainly a driver. In other words, the route information input device 15 is configured to allow for a collective input of a series of pieces of information to be involved in setting of a travel route in the map locator processor 12. The setting of the travel route may include, for example, setting of a destination or a via-point. Non-limiting examples of the via-point may include a service area on an expressway.

In one example, the route information input device 15 may include an input unit (e.g., a touchscreen of a monitor) of a car navigation system, a mobile terminal such as a smart phone, and/or a personal computer, without limitation. The route information input device 15 may be coupled to the map locator processor 12 by wire or wirelessly.

The route information input device 15 may accept an operation by the occupant of inputting information regarding the destination or the via-point. Non-limiting examples of such information may include a name of facilities, an address, and a telephone number. The information thus inputted may be read by the map locator processor 12.

With the destination and/or the via-point inputted, the map locator processor 12 may set positional coordinates, i.e., a latitude and a longitude, of the destination and/or the via-point. The map locator processor 12 may include an own vehicle position estimation processor 12a and a travel route setting processor 12b. In one embodiment of the disclosure, the own vehicle position estimation processor 12a may serve as an own vehicle position estimation processor configured to estimate an own vehicle position. The travel route setting processor 12b may set the travel route from the own vehicle position to the destination (and to the via-point).

The high-precision road map database 16 may be a large-capacity storage medium such as a hard disk drive (HDD). The high-precision road map database 16 may hold known high-precision road map data, i.e., a local dynamic map. The high-precision road map data has a hierarchical structure in which additional map data is superimposed on a static information hierarchy of the lowest layer as a base. The additional map data is provided for assistance with automated driving. The additional map data may include static positional information and dynamic positional information. Non-limiting examples of the static positional information may include kinds of roads (e.g., a general road and an expressway), a road shape, left and right lane lines, an exit from, for example, an expressway or a bypass road, a length (a start position and an end position) of an entrance to a branch lane coupled to a junction or a service area, and a latitude, a longitude, and an altitude of a road. Non-limiting examples of the dynamic positional information may include information regarding traffic congestion, and traffic restrictions due to an accident or construction work.

The own vehicle position estimation processor 12a may acquire the current positional coordinates, i.e., the latitude and the longitude, of the own vehicle on the basis of the positioning signals received by the GNSS receiver 13. The own vehicle position estimation processor 12a may perform map matching of the positional coordinates on the map data, to estimate the own vehicle position (current position) on the road map. Moreover, the own vehicle position estimation processor 12a may identify a traveling lane of the own vehicle, and acquire the road shape of the relevant traveling lane held in the map data, for sequential storage. Furthermore, in an environment, e.g., inside a tunnel, in which lowered sensitivity of the GNSS receiver 13 inhibits reception of valid positioning signals from the positioning satellites, the own vehicle position estimation processor 12a may switch to autonomics navigation and perform localization by the autonomous travel sensor 14.

The travel route setting processor 12b may refer to the local dynamic map held in the high-precision road map database 16, on the basis of the positional information, i.e., the latitude and the longitude, of the own vehicle position estimated by the own vehicle position estimation processor 12a and on the basis of the positional information, i.e., the latitude and the longitude, of the inputted destination (and the via-point). Thus, the travel route setting processor 12b may form the travel route, on the local dynamic map, on the basis of a preset route condition. The travel route is routed from the own vehicle position to the destination. If any via-point is set, the travel route is routed from the own vehicle position to the destination through the via-point. Non-limiting examples of the preset route condition may include, for example, a recommended route and a fastest route.

The camera unit 21 may be fixed to the upper middle of a front portion of a cabin of the own vehicle. The camera unit 21 may include an on-vehicle camera, i.e., a stereo camera, an image processing unit (IPU) 21c, and a forward travel environment recognition processor 21d. The on-vehicle camera may include a main camera 21a and a sub-camera 21b. The main camera 21a and the sub-camera 21b may be disposed at symmetrical positions with respect to a midpoint in a vehicle-widthwise direction. The camera unit 21 may allow the main camera 21a to capture reference image data, and allow the sub-camera 21b to capture comparative image data.

The camera unit 21 may allow the IPU 21c to perform predetermined image processing on both pieces of the image data. The forward travel environment recognition processor 21d may read the reference image data and the comparative image data that have been subjected to the image processing by the IPU 21c, and recognize the same object in both of the images on the basis of their parallax. Moreover, the forward travel environment recognition processor 21d may calculate distance data regarding the object, with the use of the principles of triangulation, to recognize forward travel environment data. The distance data may include a distance from the own vehicle to the object.

The forward travel environment data may include the road shape of the traveling lane of the own vehicle, an exit from, for example, an expressway or a bypass road, a lane width between lane lines of a branch lane coupled to a junction, an intersection, a pedestrian crossing, a traffic signal, a road sign, a three-dimensional object present on the road, e.g., a vehicle, and a roadside obstacle. Non-limiting examples of the road shape may include lane lines that define right and left sides of a lane, a road curvature of a centerline between the lane lines [unit: 1/m], and a lane width, i.e., a width between the right and left lane lines. Non-limiting examples of the roadside obstacle may include a utility pole, a telephone pole, and a parked vehicle.

To input side of the automated driving control processor 26, the forward travel environment recognition processor 21d of the camera unit 21 may be coupled. The automated driving control processor 26 may be coupled to the map locator processor 12, and configured to establish bi-directional communication with the map locator processor 12 through an in-vehicle communication line such as CAN (Controller Area Network). Furthermore, to the automated driving control processor 26, for example, a steering control processor 31, a brake control processor 32, an engine control processor 33, a transmission control processor 34, and an alarm unit 35 may be coupled. The steering control processor 31 may allow the own vehicle to travel along the travel route. The brake control processor 32 may cause deceleration of the own vehicle by forced braking. The engine control processor 33 and the transmission control processor 34 may control the vehicle speed through an acceleration rate control of the own vehicle. The alarm unit 35 may include, for example, a monitor and a speaker.

In a case where an automated driving section is set on the travel route set by the travel route setting processor 12b, the automated driving control processor 26 may set a target course. The automated driving section is a section where an automated driving control is permitted. The target course is provided for the automated driving in the relevant automated driving section. In the automated driving section, the automated driving control processor 26 may make a predetermined control of the steering control processor 31, the brake control processor 32, the engine control processor 33, and the transmission control processor 34, to cause the own vehicle to travel automatically along the target course, on the basis of the positioning signals indicating the own vehicle position received by the GNSS receiver 13.

On this occasion, on the basis of the forward travel environment data recognized by the forward travel environment recognition processor 21d, the automated driving control processor 26 may carry out a known adaptive cruise control (ACC control) and an adaptive lane keeping (ALK) control. In a case with any preceding vehicle detected, the automated driving control processor 26 may allow the own vehicle to follow the preceding vehicle. In a case with no preceding vehicle detected, the automated driving control processor 26 may allow the own vehicle to travel at a set vehicle speed within a range of speed limitation.

The map locator processor 12, the forward travel environment recognition processor 21d, the automated driving control processor 26, the steering control processor 31, the brake control processor 32, the engine control processor 33, and the transmission control processor 34 may include, for example, a known microcomputer and peripheral devices thereof. The microcomputer may include, for example, a CPU (Central Processing Unit), a RAM (Random Access Memory), a ROM (Read Only Memory), and a non-volatile storage. In the ROM, programs to be executed in the CPU and fixed data such as data tables may be held in advance.

Description is given next, mainly of the supercharging control of the engine 101, regarding a control of the drive system 100 on the occasion that the automated driving system 1 having such a configuration makes the vehicle speed control of the own vehicle. The supercharging control may be carried out by, for example, a vehicle control device 30 included in the automated driving system 1. As illustrated in FIG. 2, the vehicle control device 30 may include the automated driving control processor 26, the engine control processor 33, and the transmission control processor 34.

The automated driving control processor 26 may serve as a control system for the drive system 100 of the own vehicle and include a target acceleration rate processor 26a, an acceleration rate feedback processor 26b, a target driving force processor 26c, a target torque processor 26d, a requested torque processor 26e, a target speed processor 26f, and a requested speed processor 26g. In one embodiment of the disclosure, the target acceleration rate processor 26a may serve as a target acceleration rate processor. The acceleration rate feedback processor 26b may serve as an acceleration rate feedback processor. The target driving force processor 26c may serve as a target driving force processor. The target torque processor 26d may serve as a target torque processor. The requested torque processor 26e may serve as a requested torque processor. The target speed processor 26f may serve as a target speed processor. The requested speed processor 26g may serve as a requested speed processor.

For example, in a case where a preceding vehicle is captured by the forward travel environment recognition processor 21d, i.e., on follow-up travel to the preceding vehicle, the target acceleration rate processor 26a may refer to, for example, a preset map, to calculate a target acceleration rate to be used in the ACC control (vehicle speed control), on the basis of, for example, an own vehicle speed, a vehicle speed of the preceding vehicle, and a clearance from the own vehicle to the preceding vehicle. For example, in a case where no preceding vehicle is captured by the forward travel environment recognition unit 21d, i.e., on constant-speed travel at the set vehicle speed, the target acceleration rate processor 26a may refer to, for example, a preset map, to calculate the target acceleration rate to be used in the ACC control (vehicle speed control), on the basis of, for example, the own vehicle speed and the set vehicle speed.

The acceleration rate feedback processor 26b may be supplied with the target acceleration rate calculated by the target acceleration rate processor 26a, and a current acceleration rate of the own vehicle, i.e., an actual acceleration rate. The acceleration rate feedback processor 26b may make calculation of an amount of offset for acceleration rate feedback, on the basis of a deviation between the target acceleration rate and the actual acceleration rate. In one embodiment of the disclosure, the amount of offset for the acceleration rate feedback may serve as an amount of acceleration rate feedback.

As described later, in a case where relation between the requested torque of the engine and supercharging determination torque satisfies a preset condition, the calculation of the amount of offset for the acceleration rate feedback by the acceleration rate feedback processor 26b is inhibited. That is, a value of the amount of offset for the acceleration rate feedback may be maintained. The supercharging determination torque is a threshold provided to determine whether or not to switch on the supercharger 111.

Figure 3:
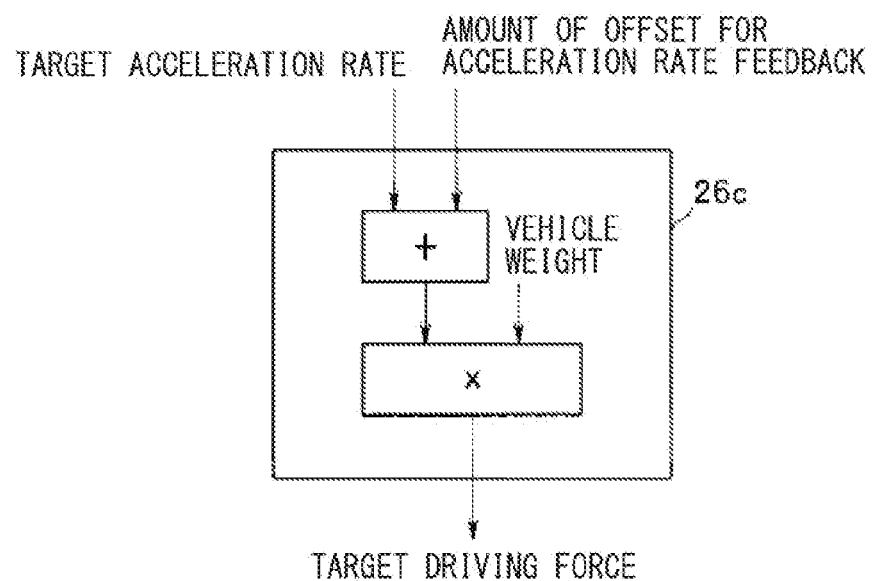
FIG. 3 illustrates a target driving force processor.

The target driving force processor 26c may be supplied with the target acceleration rate calculated by the target acceleration rate processor 26a, and the amount of offset for the acceleration rate feedback calculated by the acceleration rate feedback processor 26b. For example, as illustrated in FIG. 3, the target driving force processor 26c may multiply a sum of the target acceleration rate and the amount of offset for the acceleration rate feedback by vehicle weight of the own vehicle, to calculate the target driving force.

The target torque processor 26d may be supplied with the target driving force calculated by the target driving force processor 26c, and the transmission ratio of the CVT 102. The transmission ratio of the CVT 102 is controlled in the transmission control processor 34. For example, the target torque processor 26d may refer to, for example, a preset map, to calculate target torque on the basis of the target driving force and the transmission ratio.

Figure 4:
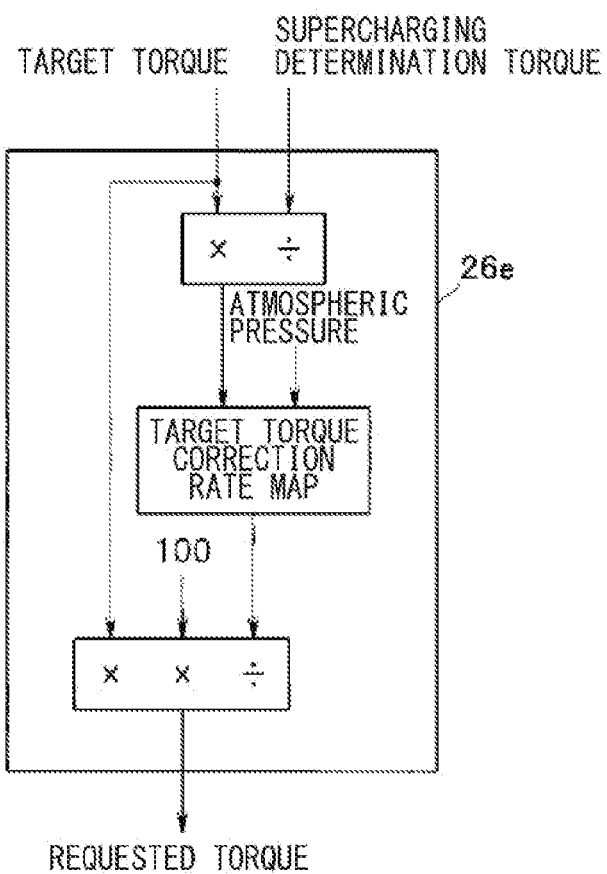
FIG. 4 illustrates a requested torque processor.

The requested torque processor 26e may be supplied with the target torque calculated by the target torque processor 26d, and the supercharging determination torque calculated by the supercharging determination torque processor 33b described later, and an atmospheric pressure, i.e., an outside air pressure, detected by an atmospheric pressure sensor 41. For example, as illustrated in FIGS. 4 and 5, the requested torque processor 26e may refer to, for example, a preset map of a target torque correction rate, to calculate the target torque correction rate, on the basis of a quotient obtained by dividing the target torque by the supercharging determination torque, and on the basis of the atmospheric pressure. In the following, the quotient obtained by dividing the target torque by the supercharging determination torque is referred to as a target torque versus supercharging determination torque ratio.

Here, the target torque correction rate is represented by a torque generation rate. The torque generation rate is a value (%) that indicates how much output torque is generated at atmospheric pressure at a current altitude, with respect to reference output torque. The reference output torque is torque to be generated on the occasion that the engine 101 is driven by the same requested torque (the amount of intake air) as on flat ground (atmospheric pressure 760 [mmHg]). As is clear from the map, the torque generation rate after the supercharger of the engine 101 has operated is 100%.

The requested torque processor 26e may multiply, by 100, a quotient obtained by dividing the target torque by the target torque correction rate, to calculate the requested torque of the engine 101. That is, in the case where the target torque is smaller than the supercharging determination torque, the requested torque processor 26e adds, to the target torque, an amount by which the output torque decreases in accordance with the altitude, to calculate the requested torque.

The requested torque thus calculated may be outputted to the engine control processor 33. The engine control processor 33 may be supplied with, in addition to the requested torque, the atmospheric pressure detected by the atmospheric pressure sensor 41, a rotational speed of the engine 101 detected by an engine speed sensor 40, and an intake air temperature detected by an intake air temperature sensor 42.

The engine control processor 33 may include, for example, a target throttle plate position processor 33a, a supercharging determination torque processor 33b, and a supercharging operation determination processor 33c. In one embodiment of the disclosure, the target throttle plate position processor 33a may serve as a target throttle plate position processor. The supercharging determination torque processor 33b may serve as a supercharging determination torque processor. The supercharging operation determination processor 33c may serve as a supercharging operation determination processor.

The target throttle plate position processor 33a may be supplied with the requested torque calculated by the requested torque processor 26e and the rotational speed of the engine 101 detected by the engine speed sensor 40. The target throttle plate position processor 33a may refer to, for example, a preset map to calculate a target throttle plate position, on the basis of the requested torque and the rotational speed of the engine 101. The target throttle plate position processor 33a may control a throttle plate position of the throttle valve 110 of the electronic controlled throttle, on the basis of the target throttle plate position.

In this case, as described above, the requested torque is a value that compensates the target torque for an amount by which torque is assumed to decrease in accordance with the altitude. Controlling the throttle valve 110 of the engine 101 on the basis of such requested torque allows for generation of the output torque of the engine 101 corresponding to the target torque even in the non-supercharging state.

The supercharging determination torque processor 33b may be supplied with the atmospheric pressure detected by the atmospheric pressure sensor 41, the rotational speed of the engine 101 detected by the engine speed sensor 40, and the intake air temperature detected by the intake air temperature sensor 42. The supercharging determination torque processor 33b may refer to, for example, a preset map to calculate the supercharging determination torque, on the basis of the atmospheric pressure and the rotational speed of the engine 101. Furthermore, the supercharging determination torque processor 33b may correct the supercharging determination torque on the basis of the intake air temperature.

Here, the supercharging determination torque is provided to determine whether or not to switch on the supercharger 111. That is, the supercharging determination torque is a threshold to be used in determining whether to switch the supercharger 111 between an operating state and a non-operating state. For example, the supercharging determination torque is torque assumed to be generated with the throttle valve 110 fully open, for example, at the current rotational speed of the engine 101 and in the current vehicle exterior environment (the intake air temperature and the atmospheric pressure). It is to be noted that in the calculation of the supercharging determination torque, the correction based on the intake air temperature may be omitted as appropriate. Moreover, the supercharging determination torque processor 33b may be provided in the automated driving control processor 26.

Figure 8:
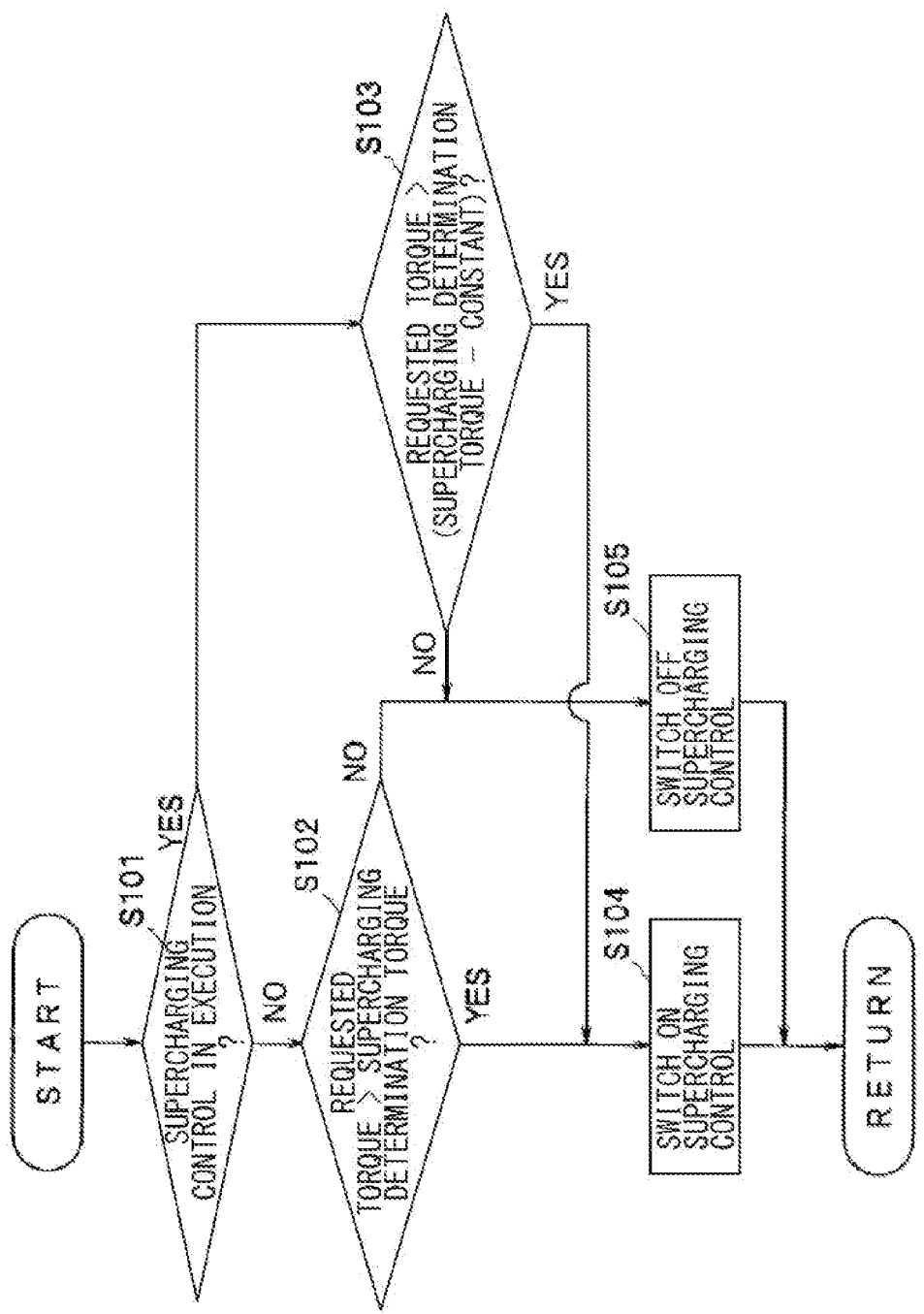
FIG. 8 is a flowchart of a routine of determination of a supercharging control.

The supercharging operation determination processor 33c may be supplied with the requested torque calculated by the requested torque processor 26e, and the supercharging determination torque calculated by the supercharging determination torque processor 33b. The supercharging operation determination processor 33c may determine whether to switch on or off the supercharger 111 on the basis of a result of comparison of the requested torque and the supercharging determination torque. For example, the supercharging operation determination processor 33c may execute a routine of determination of the supercharging control in accordance with a flowchart illustrated in FIG. 8. This routine may be executed repeatedly at set time intervals. At a start of the routine, in step S101, the supercharging operation determination processor 33c may, first, check whether or not the supercharging control is currently in execution, that is, whether or not the supercharger 111 is in the supercharging state.

In step S101, in a case with a determination that the supercharging control is currently out of execution and that the supercharger 111 is in the non-supercharging state (NO in step S101), the supercharging operation determination processor 33c may cause the flow to proceed to step S102, to check whether or not the requested torque is greater than the supercharging determination torque.

In step S102, in a case with a determination that the requested torque is greater than the supercharging determination torque (YES in step S102), the supercharging operation determination processor 33c may cause the flow to proceed to step S104. In step S102, in a case with a determination that the requested torque is equal to or smaller than the supercharging determination torque (NO in step S102), the supercharging operation determination processor 33c may cause the flow to proceed to step S105.

In step S101, in a case with a determination that the supercharging control is currently in execution, and that the supercharger 111 is in the supercharging state (YES in step S101), the supercharging operation determination processor 33c may check whether or not the requested torque is smaller than a value obtained by subtracting a constant from the supercharging determination torque. Here, the constant is a value that provides hysteresis between the operation and non-operation of the supercharger 111.

In step S103, in a case with a determination that the requested torque is smaller than the value obtained by subtracting the constant from the supercharging determination torque, the supercharging operation determination processor 33c may cause the flow to proceed to step S104. In step S103, in a case with a determination that the requested torque is equal to or greater than the value obtained by subtracting the constant from the supercharging determination torque, the supercharging operation determination processor 33c may cause the flow to proceed to step S105.

Upon the flow proceeding from step S102 or S103 to step S104, the supercharging operation determination processor 33c may switch ON the supercharging control, bringing the supercharger 111 to the supercharging state. Thereafter, the supercharging operation determination processor 33c may terminate the routine.

Upon the flow proceeding from step S102 or S103 to step S104, the supercharging operation determination processor 33c may switch OFF the supercharging control, bringing the supercharger 111 to the non-supercharging state. Thereafter, the supercharging operation determination processor 33c may terminate the routine.

As described, the control of the engine 101 is carried out, not on the basis of the target torque directly derived from the target driving force and the transmission ratio of the CVT 102, but on the basis of the requested torque obtained by compensating the target torque with the use of the target torque correction rate. Hence, in the case where the requested torque is in the vicinity of a value at which the determination is made as to whether to switch ON or OFF the supercharging control, it is possible to reduce a difference between the output torque with the supercharger 111 in the supercharging state and the output torque with the supercharger 111 in the non-supercharging state. This leads to alleviation of the stepwise change in the torque as mentioned above on the occasion of the switching ON and OFF of the supercharging control.

In the automated driving control processor 26, the target speed processor 26f may be supplied with the target driving force calculated by the target driving force processor 26c and the vehicle speed of the own vehicle, i.e., an actual vehicle speed. For example, the target speed processor 26f may refer to, for example, a preset map, e.g., a compatibility map, to calculate a target speed of the primary pulley 123, i.e., a target primary pulley speed, on the basis of the target driving force and the actual vehicle speed.

Figure 6:
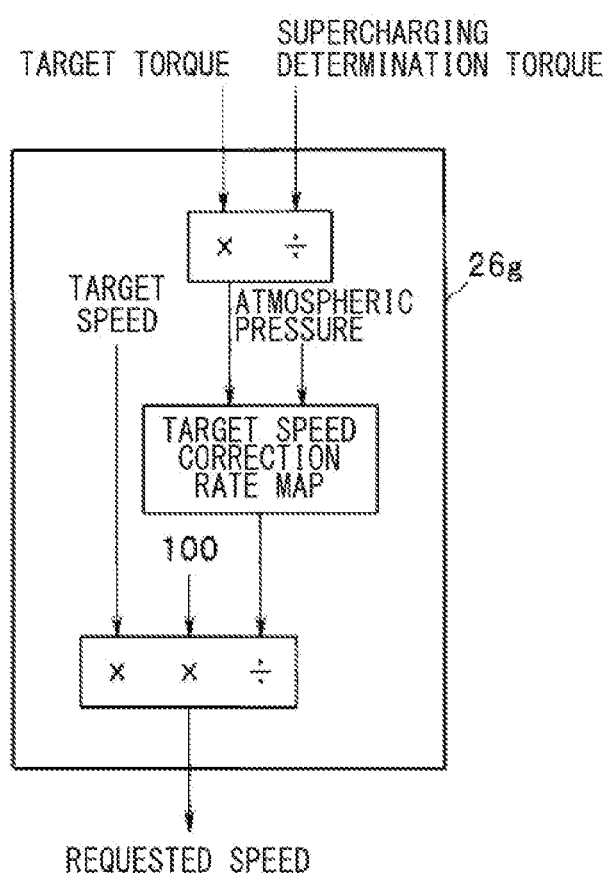
FIG. 6 illustrates a requested speed processor.

The requested speed processor 26g may be supplied with the target speed calculated in the target speed processor 26f, the supercharging determination torque calculated by the supercharging determination torque processor 33b, and the atmospheric pressure detected by the atmospheric pressure sensor 41. For example, as illustrated in FIGS. 6 and 7, the requested speed processor 26g may refer to, for example, a preset map of a target speed correction rate to calculate the target speed correction rate, on the basis of a quotient obtained by dividing the requested torque by the supercharging determination torque, and on the basis of the atmospheric pressure. In the following, the quotient obtained by dividing the requested torque by the supercharging determination torque is referred to as a requested torque versus supercharging determination torque ratio.

The requested speed processor 26g may multiply, by 100, a quotient obtained by dividing the target speed by the target speed correction rate, to calculate the target speed for the CVT 102.

As is clear from FIG. 7, the target speed correction rate is provided for correcting the target speed of the primary pulley 123 in accordance with the altitude. This renders it unnecessary to correct the target speed on the flat ground, and the target speed correction rate may be set to 100% regardless of the requested torque versus supercharging determination torque ratio. In contrast, in the highlands, the target speed correction rate may be set at a greater value than 100% as the altitude becomes higher, in the case where the requested torque is in the vicinity of the value at which the supercharger 111 of the engine 101 switches between the non-supercharging state and the supercharging state, i.e., in the case where the requested torque versus supercharging determination torque ratio is in the vicinity of 1.00. Thus, in the highlands, the requested speed for the CVT 102 in the case where the request torque versus supercharging determination torque ratio is in the vicinity of 1.00 is calculated as a smaller value than on the flat ground as the altitude becomes higher. It is to be noted that the target speed correction rate may assume its maximum value in the vicinity of a value at which the request torque versus supercharging determination torque ratio becomes greater than 1.00. The target speed correction rate may be set to gradually change toward and away from the maximum value. This makes it possible to prevent a rapid change in the requested speed.

As described, while the own vehicle is traveling in the highlands, the requested speed for the CVT 102 is calculated as the smaller value than on the flat ground as the altitude becomes higher, in the case where the requested torque versus supercharging determination torque ratio is in the vicinity of 1.00. This leads to a lower deceleration ratio, causing the target torque to be calculated in the target torque processor 26d as a greater value than on the flat ground. Furthermore, calculating the requested speed as a small value causes the rotational speed of the engine 101 to be controlled low. This also causes the supercharging determination torque to be calculated as a small value accordingly.

Thus, in the case with the supercharger 111 in the non-supercharging state, in the highlands, the supercharging control is likely to be switched ON as the requested torque versus supercharging determination torque ratio approaches the vicinity of 1.00. Furthermore, once the supercharger 111 is brought to the supercharging state, in the highlands, the supercharging control is less likely to be switched OFF than on the flat ground. Hence, in the highlands, it is easier to stably keep the supercharging control ON, without continuing the supercharging control near a border of the ON/OFF switching.

The requested speed thus calculated may be outputted to the transmission control processor 34. The transmission control processor 34 may be supplied with, in addition to the requested speed, a speed of the primary pulley 123, i.e., a primary pulley speed, detected by a primary pulley speed sensor 43, and a speed of the secondary pulley 124, i.e., a secondary pulley speed, detected by a secondary pulley speed sensor 44.

The transmission control processor 34 may include a transmission ratio control processor 34a. For example, the transmission ratio control processor 34a may control the transmission ratio of the transmission 122 on the basis of the requested speed, the primary pulley speed, and the secondary pulley speed.

In the calculation of the target driving force in the target driving force processor 26c of the automated driving control processor 26 described above, the correction on the target driving force by the amount of offset for the acceleration rate feedback is inhibited, in the case where the requested torque is in the vicinity of the value at which the supercharger 111 switches between the operating state and the non-operating state. That is, in the case where the requested torque is in the vicinity of the value at which the supercharger 111 switches between the operating state and the non-operating state, the acceleration rate feedback processor 26b may maintain the amount of offset for the acceleration rate feedback, to inhibit the correction based on the acceleration rate feedback.

Figure 9:
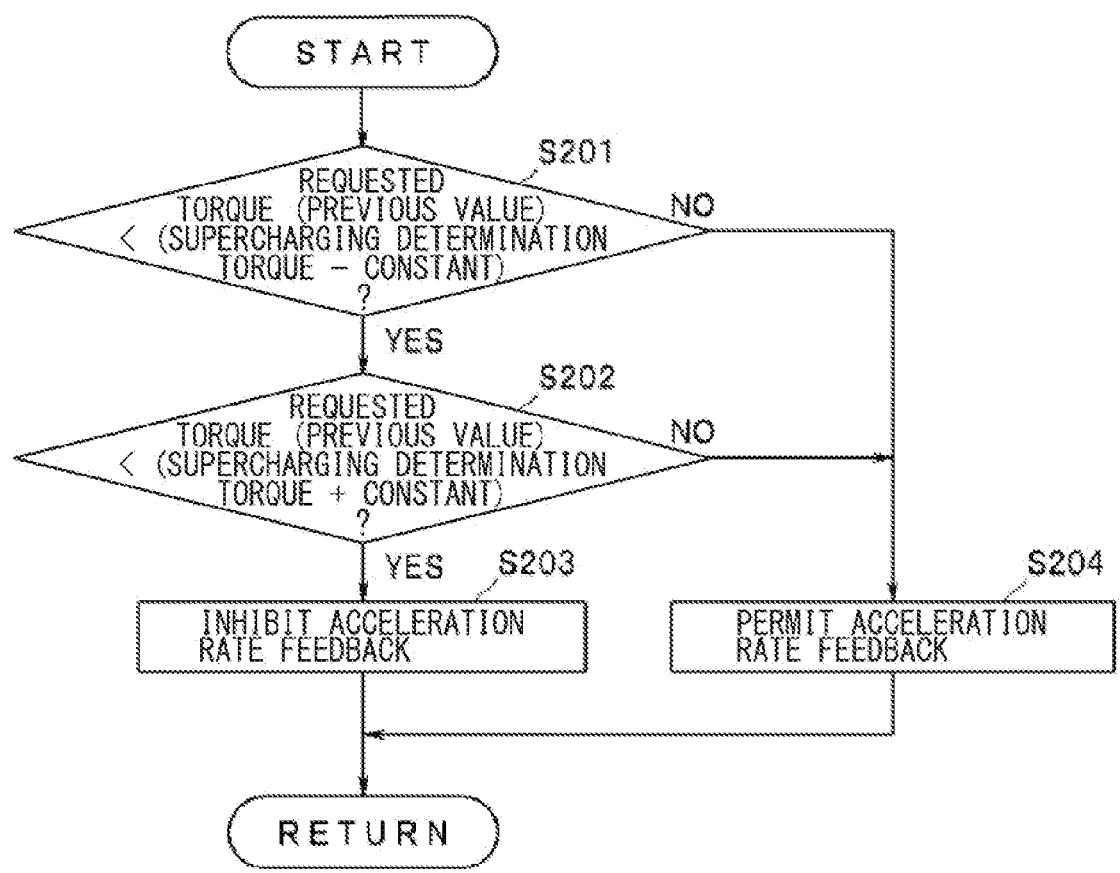
FIG. 9 is a flowchart of a routine of determination of inhibition of acceleration rate feedback.

Such inhibition of the acceleration rate feedback may be determined in accordance with, for example, a flowchart of a routine of inhibition of the acceleration rate feedback as illustrated in FIG. 9. This routine may be executed repeatedly at set time intervals. At a start of the routine, in step S201, the acceleration rate feedback processor 26b may, first, check whether or not a previous value of the requested torque is greater than the value obtained by subtracting the constant from the supercharging determination torque.

In step S201, in a case with a determination that the previous value of the requested torque is greater than the value obtained by subtracting the constant from the supercharging determination torque (YES in step S201), the acceleration rate feedback processor 26b may cause the flow to proceed to step S202. In step S201, in a case with a determination that the previous value of the requested torque is equal to or smaller than the value obtained by subtracting the constant from the supercharging determination torque (NO in step S201), the acceleration rate feedback processor 26b may cause the flow to proceed to step S204.

Upon the flow proceeding from step S201 to step S202, the acceleration rate feedback processor 26b may check whether or not the previous value of the requested torque is smaller than a value obtained by adding the constant to the supercharging determination torque.

In step S202, in a case with a determination that the previous value of the requested torque is smaller than the value obtained by adding the constant to the supercharging determination torque (YES in step S202), the acceleration rate feedback processor 26b may cause the flow to proceed to step S203. In step S202, in a case with a determination that the previous value of the requested torque is equal to or greater than the value obtained by adding the constant to the supercharging determined torque (NO in step S202), the acceleration rate feedback processor 26b may cause the flow to proceed to step S204.

Upon the flow proceeding from step S202 to step S203, the acceleration rate feedback processor 26b may inhibit the acceleration rate feedback, and thereafter, terminate the routine.

Upon the flow proceeding from step S201 or S202 to step S204, the acceleration rate feedback processor 26b may permit the acceleration rate feedback, and thereafter, terminate the routine.

As described, in the case where the requested torque is in the vicinity of the supercharging determination torque, that is, in the case where the requested torque is in the vicinity of the value at which the ON and OFF states of the supercharger 111 are switched, the feedback based on the actual acceleration rate is inhibited. This leads to suppression of fluctuation of the target driving force to be calculated in the target driving force processor 26c, allowing for suppression of the fluctuation of the requested torque to be calculated in the vicinity of the value at which the ON and OFF states of the supercharger 111 are switched. This leads to enhanced stability of the ON and OFF states of the supercharger 111 to be switched on the basis of the comparison of the requested torque and the supercharging determination torque.

As described, in this embodiment, it is possible to make the vehicle speed control without causing the control hunching for the supercharger 111, even at a high altitude with a low air density.

In the forgoing embodiment, the description is given of the example where, for example, the map locator processor 12, the forward travel environment recognition processor 21d, the automated driving control processor 26, the steering control processor 31, the brake control processor 32, the engine control processor 33, and the transmission control processor 34 include the microcomputer including the CPU, without limitation, and the peripheral devices thereof. However, all or part of these processors may include a logic circuit or an analog circuit. Alternatively, the processing of various programs may be realized by an electronic circuit such as an FPGA (field programmable gate array).

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. Furthermore, the forgoing embodiments each include the technology at various stages, and various technologies may be extracted from the forgoing embodiments by appropriately combining a plurality of constituent elements disclosed therein.

For example, in the forgoing embodiments, the description is given of the example where the requested torque processor 26e corrects the target torque by the target torque correction rate to calculate the request torque, and the requested speed processor 26g corrects the target speed by the target speed correction rate to calculate the requested speed. However, a configuration may be adopted in which either one of these processes is carried out. That is, in the forgoing embodiments, solely the process of correcting the target torque by the target torque correction rate to calculate the requested torque may be performed in the requested torque processor 26e, and the requested speed processor 26e may give the target speed as it is, as the requested speed. Alternatively, solely the process of correcting the target speed by the target speed correction rate to calculate the requested speed may be performed in the requested speed processor 26g, and the requested torque processor 26e may give the target torque as it is, as the requested torque.

The vehicle control device 30 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle control device 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle control device 30 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control device configured to perform a vehicle speed control of a vehicle in which a driving force from an engine including a supercharger is transmitted to a driving wheel through a transmission, the vehicle control device comprising:
   an acceleration rate feedback processor configured to perform calculation of an amount of acceleration rate feedback on a basis of a target acceleration rate and a current actual acceleration rate, the target acceleration rate being calculated in the vehicle speed control;
   a target driving force processor configured to calculate a target driving force on a basis of the target acceleration rate and the amount of the acceleration rate feedback;
   a requested torque processor configured to calculate requested torque of the engine on a basis of target torque, the target torque being calculated on a basis of the target driving force and a transmission ratio of the transmission;
   a supercharging determination torque processor configured to calculate supercharging determination torque on a basis of a rotational speed of the engine and atmospheric pressure, the supercharging determination torque being provided to determine whether or not to switch on the supercharger;
   a requested speed processor configured to calculate a requested speed on input side of the transmission, on a basis of a target speed, the target speed being calculated on a basis of the target driving force and an actual vehicle speed of the vehicle; and
   a supercharging operation determination processor configured to determine whether to switch on or off the supercharger, on a basis of a result of comparison of the requested torque and the supercharging determination torque, wherein
   when determining that the requested torque is in vicinity of the supercharging determination torque, the acceleration rate feedback processor is configured to inhibit the calculation of the amount of the acceleration rate feedback, and
   when determining that the requested torque is in the vicinity of the supercharging determination torque, the requested speed processor is configured to correct the target speed in accordance with an altitude, to set the requested speed at a smaller value than on flat ground as the altitude becomes higher.

2. A vehicle control device configured to perform a vehicle speed control of a vehicle in which a driving force from an engine including a supercharger is transmitted to a driving wheel through a transmission, the vehicle control device comprising:
   an acceleration rate feedback processor configured to perform calculation of an amount of acceleration rate feedback on a basis of a target acceleration rate and a current actual acceleration rate, the target acceleration rate being calculated in the vehicle speed control;
   a target driving force processor configured to calculate a target driving force on a basis of the target acceleration rate and the amount of the acceleration rate feedback;
   a requested torque processor configured to calculate requested torque of the engine on a basis of target torque, the target torque being calculated on a basis of the target driving force and a transmission ratio of the transmission;
   a supercharging determination torque processor configured to calculate supercharging determination torque on a basis of a rotational speed of the engine and atmospheric pressure, the supercharging determination torque being provided to determine whether or not to switch on the supercharger; and
   a supercharging operation determination processor configured to determine whether to switch on or off the supercharger, on a basis of a result of comparison of the requested torque and the supercharging determination torque, wherein
   when determining that the requested torque is in vicinity of the supercharging determination torque, the acceleration rate feedback processor is configured to inhibit the calculation of the amount of the acceleration rate feedback, and
   when determining that the target torque is smaller than the supercharging determination torque, the requested torque processor is configured to add, to the target torque, an amount by which output torque decreases in accordance with an altitude.

3. The vehicle control device according to claim 1, wherein on a condition that the target torque is smaller than the supercharging determination torque, the requested torque processor is configured to add, to the target torque, an amount by which output torque decreases in accordance with the altitude.

4. A vehicle control device configured to perform a vehicle speed control of a vehicle in which a driving force from an engine including a supercharger is transmitted to a driving wheel through a transmission, the vehicle control device comprising circuitry configured to:
   perform calculation of an amount of acceleration rate feedback on a basis of a target acceleration rate and a current actual acceleration rate, the target acceleration rate being calculated in the vehicle speed control;
   calculate a target driving force on a basis of the target acceleration rate and the amount of the acceleration rate feedback;
   calculate requested torque of the engine on a basis of target torque, the target torque being calculated on a basis of the target driving force and a transmission ratio of the transmission;
   calculate supercharging determination torque on a basis of a rotational speed of the engine and atmospheric pressure, the supercharging determination torque being provided to determine whether or not to switch on the supercharger;
   calculate a requested speed on input side of the transmission, on a basis of a target speed, the target speed being calculated on a basis of the target driving force and an actual vehicle speed of the vehicle; and
   determine whether to switch on or off the supercharger, on a basis of a result of comparison of the requested torque and the supercharging determination torque, wherein when determining that the requested torque is in vicinity of the supercharging determination torque, the circuitry is configured to inhibit the calculation of the amount of the acceleration rate feedback, and when determining that the requested torque is in the vicinity of the supercharging determination torque, the circuitry is configured to correct the target speed in accordance with an altitude, to set the requested speed at a smaller value than on flat ground as the altitude becomes higher.

5. A vehicle control device configured to perform a vehicle speed control of a vehicle in which a driving force from an engine including a supercharger is transmitted to a driving wheel through a transmission, the vehicle control device comprising circuitry configured to:

perform calculation of an amount of acceleration rate feedback on a basis of a target acceleration rate and a current actual acceleration rate, the target acceleration rate being calculated in the vehicle speed control;

calculate a target driving force on a basis of the target acceleration rate and the amount of the acceleration rate feedback;

calculate requested torque of the engine on a basis of target torque, the target torque being calculated on a basis of the target driving force and a transmission ratio of the transmission;

calculate supercharging determination torque on a basis of a rotational speed of the engine and atmospheric pressure, the supercharging determination torque being provided to determine whether or not to switch on the supercharger; and determine whether to switch on or off the supercharger, on a basis of a result of comparison of the requested torque and the supercharging determination torque, wherein when determining that the requested torque is in vicinity of the supercharging determination torque, the circuitry is configured to inhibit the calculation of the amount of the acceleration rate feedback, and when determining that the target torque is smaller than the supercharging determination torque, the circuitry is configured to add, to the target torque, an amount by which output torque decreases in accordance with an altitude.

* * * * *